United States Patent
Sanga et al.

(10) Patent No.: US 12,445,002 B2
(45) Date of Patent: Oct. 14, 2025

(54) MAGNET-EMBEDDED ROTATING MACHINE WITH MAGNETS HAVING DIFFERENT COERCIVE FORCES

(71) Applicant: DAIKIN INDUSTRIES, LTD., Osaka (JP)

(72) Inventors: Yoshihito Sanga, Osaka (JP); Yoshinari Asano, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 321 days.

(21) Appl. No.: 18/108,400

(22) Filed: Feb. 10, 2023

(65) Prior Publication Data

US 2023/0198325 A1 Jun. 22, 2023

Related U.S. Application Data

(63) Continuation of application No. PCT/JP2021/033554, filed on Sep. 13, 2021.

(30) Foreign Application Priority Data

Sep. 25, 2020 (JP) .................... 2020-160786

(51) Int. Cl.
*H02K 1/276* (2022.01)

(52) U.S. Cl.
CPC ....... *H02K 1/2766* (2013.01); *H02K 2213/03* (2013.01)

(58) Field of Classification Search
CPC ........ H02K 1/27; H02K 1/276; H02K 1/2766; H02K 2213/03

(Continued)

(56) References Cited

U.S. PATENT DOCUMENTS

2013/0127280 A1* 5/2013 Sugimoto ................ H02K 1/02
310/156.01

FOREIGN PATENT DOCUMENTS

EP 3561999 A1 * 10/2019 ............ H02K 21/14
JP 10-271722 A 10/1998

(Continued)

OTHER PUBLICATIONS

Constantinides Steve: "Understanding and Using Reversible Temperature Coefficients", 2009 (Jan. 1, 2009), pp. 1-28, XP093173013, URL:https://www.arnoldmagnetics.com/wp-content/uploads/2017/10/Understanding-and-Using-Reversible-Temperature-Coefficients-Constantinides-Magnetics-2010-psn-hi-res.pdf (Year: 2009).*

(Continued)

*Primary Examiner* — Alexander A Singh
*Assistant Examiner* — Charlie Frank Mann, Jr.
(74) *Attorney, Agent, or Firm* — GLOBAL IP COUNSELORS, LLP

(57) ABSTRACT

A magnet-embedded rotating machine includes a rotor including first and second magnets, and a stator. The first magnet is radially spaced from a facing surface of the stator by a first distance or longer, and the second magnet is radially spaced from the facing surface of the stator by a second distance or longer, the second distance being longer than the first distance. $Hco(A)>Hco(B)$, $Hci(A)>Hci(B)$, $Hco(A)>Hci(A)$, and $\{Hco(A)/Hci(A)\}>\{Hco(B)/Hci(B)\}$. $Hco(A)$ represents a coercive force of the first magnet within a first temperature range corresponding to startup temperatures of the rotating machine. $Hco(B)$ represents a coercive force of the first magnet within a second temperature range corresponding to steady state driving temperatures of the rotating machine. $Hci(A)$ represents a coercive force of the second magnet within the first temperature range. $Hci(B)$ (Continued)

represents a coercive force of the second magnet within the second temperature range.

15 Claims, 13 Drawing Sheets

(58) Field of Classification Search
USPC .................................................. 310/156.53
See application file for complete search history.

(56) References Cited

FOREIGN PATENT DOCUMENTS

| JP | 2011-29293 A | 2/2011 | | |
|---|---|---|---|---|
| JP | 2011-223742 A | 11/2011 | | |
| JP | 2013-51763 A | 3/2013 | | |
| WO | WO-2013135377 A2 * | 9/2013 | ............... | H02K 1/02 |
| WO | WO-2018051526 A1 * | 3/2018 | ............... | H02P 6/08 |

OTHER PUBLICATIONS

Machine Translation of WO_2013135377_A2 (Year: 2013).*
Machine Translation of EP 3561999 A1 (Year: 2019).*
Machine Translation of WO 2018051526 A1 (Year: 2018).*
International Search Report of corresponding PCT Application No. PCT/JP2021/033554 dated Nov. 9, 2021.
European Search Report of corresponding EP Application No. 21 87 2239.5 dated Jun. 18, 2024.
International Preliminary Report of corresponding PCT Application No. PCT/JP2021/033554 dated Apr. 6, 2023.

* cited by examiner

MAGNET-EMBEDDED ROTATING MACHINE WITH MAGNETS HAVING DIFFERENT COERCIVE FORCES

CROSS-REFERENCE TO RELATED APPLICATIONS

This is a continuation of International Application No. PCT/JP2021/033554 filed on Sep. 13, 2021, which claims priority to Japanese Patent Application No. 2020-160786, filed on Sep. 25, 2020. The entire disclosures of these applications are incorporated by reference herein.

BACKGROUND

Technical Field

The present disclosure relates to a rotating machine.

Background Art

A magnet-embedded rotating machine that has been known in the art includes magnets having different coercive forces depending on where the magnets are embedded. A rotor of a rotating machine of this type is disclosed, for example, in Japanese Unexamined Patent Publication No. H10-271722 (in particular, paragraphs 0012, 0016).

A permanent magnet embedded rotor of Japanese Unexamined Patent Publication No. H10-271722 includes a plurality of sets of permanent magnets embedded therein. Each of the sets of permanent magnets includes plural (two or more) layers of permanent magnets per pole. These layers are spaced apart from each other in the radial direction of the rotor. Each permanent magnet has an arc shape projected toward the centripetal direction of the rotor. The permanent magnets of the multi-layer structure are such that permanent magnets located nearer to the outer periphery of the rotor are higher in coercive force than permanent magnets located nearer to the inner periphery of the rotor.

The magnet embedded rotor of Japanese Unexamined Patent Publication No. H10-271722 is such that demagnetization is less likely to occur therein, because a portion of each permanent magnet that would exhibit a significant internal magnetic flux density reduction due to the reverse magnetic field applied on the rotor by a stator is made of a magnetic material with a high coercive force. In addition, the degree of deterioration in the characteristics of the rotor is low, because only the portion of the permanent magnets that exhibit a significant internal magnetic flux density reduction due to the reverse magnetic field is made of such a magnetic material with a high coercive force.

SUMMARY

A first aspect of the present disclosure is directed to a magnet-embedded rotating machine. The magnet-embedded rotating machine includes a rotor rotatable about a shaft, and a stator having a facing surface radially facing a peripheral surface of the rotor with a gap interposed therebetween. The rotor includes a first magnet embedded in an area that is radially spaced from the facing surface of the stator by a first distance or longer, and a second magnet embedded in an area that is radially spaced from the facing surface of the stator by a second distance or longer, the second distance being longer than the first distance. $Hco(A) > Hco(B)$, $Hci(A) > Hci(B)$, $Hco(A) > Hci(A)$, and $\{Hco(A)/Hci(A)\} > \{Hco(B)/Hci(B)\}$. $Hco(A)$ represents a coercive force of the first magnet within a first temperature range corresponding to temperatures at a startup of the rotating machine. $Hco(B)$ represents a coercive force of the first magnet within a second temperature range corresponding to temperatures during steady-state driving of the rotating machine. $Hci(A)$ represents a coercive force of the second magnet within the first temperature range. $Hci(B)$ represents a coercive force of the second magnet within the second temperature range.

DETAILED DESCRIPTION OF EMBODIMENT(S)

Embodiments of the present disclosure will be described below with reference to the accompanying drawings. The following embodiments are merely preferred examples in nature, and is not intended to limit the scope, applications, or use of the present disclosure.

First Embodiment 1-1. General Configuration of Rotating Machine

Figure 1:
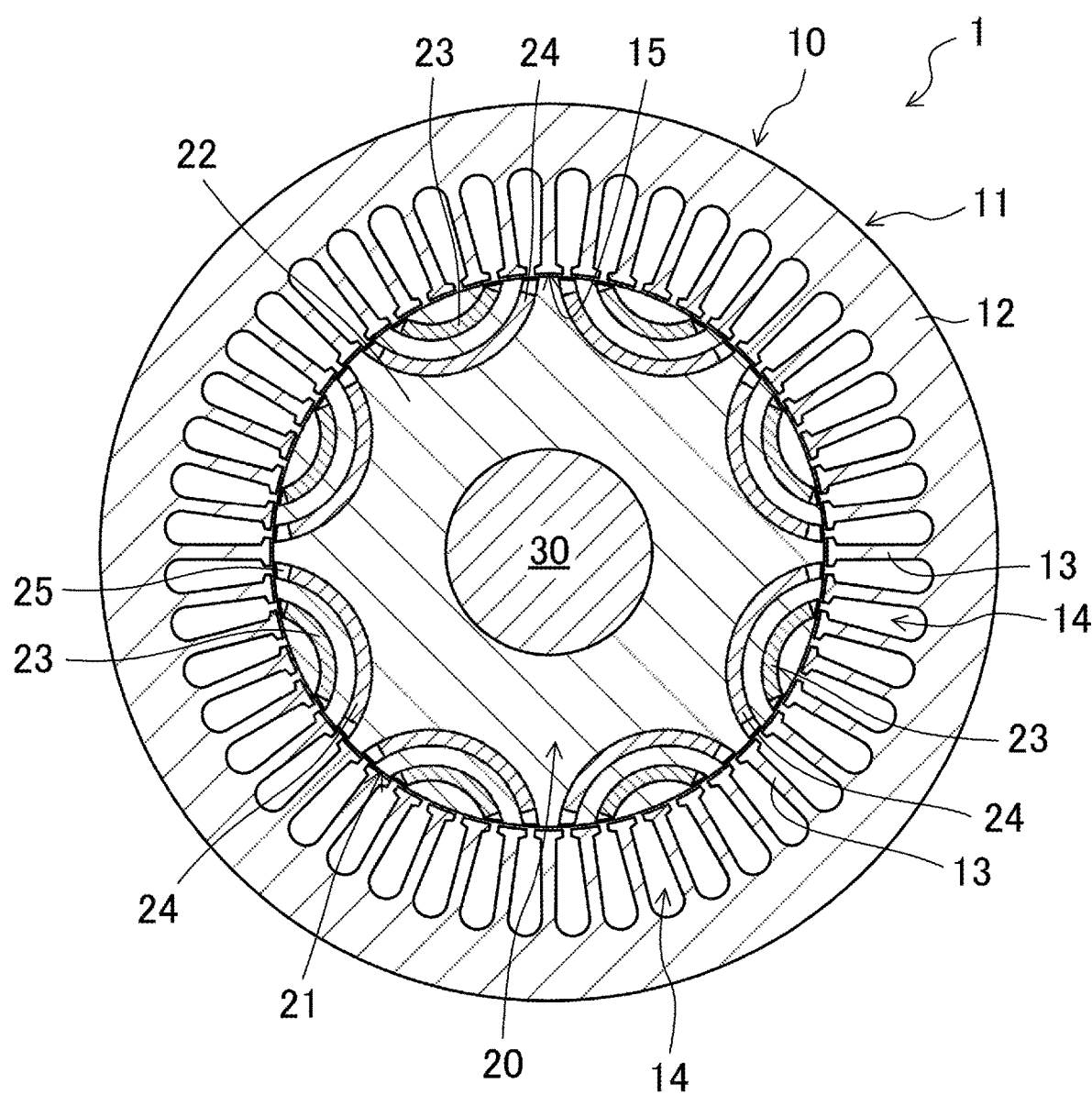
FIG. 1 is a cross-sectional view of a magnet-embedded rotating machine (1) according to a first embodiment of the present disclosure, taken along a direction perpendicular to an axial direction.

A configuration of a rotating machine (1) according to this embodiment will be described below with reference to FIGS. 1 to 3. FIG. 1 is a cross-sectional view of the rotating machine (1) according to this embodiment, taken along a plane perpendicular to a shaft (30) to be described later. The rotating machine (1) is for being mounted on, for example, a compressor of an air conditioner. As illustrated in FIG. 1, the rotating machine (1) includes a stator (10), a rotor (20), and the shaft (30).

The stator (10) is disposed nearer to the outer periphery of the rotating machine (1), and is fixed to a housing (not shown). The stator (10) includes a stator iron core (11) and windings (not illustrated).

The stator iron core (11) includes, for example, a plurality of electrical steel sheets laminated in an axial direction. The stator iron core (11) includes a back yoke (12) that is substantially ring-shaped as viewed in the axial direction, and a plurality of teeth (13) protruding radially inward (toward the rotor (20) described later) from the inner peripheral surface of the back yoke (12).

The plurality of teeth (13) are arranged on the inner peripheral surface of the back yoke (12) at substantially equal intervals in a circumferential direction. A slot (14) housing the windings therein is provided between the teeth (13) circumferentially adjacent with each other.

The windings are wound around and over each set of plural ones of the teeth (13) by distributed winding. An insulating member, such as an insulating film, is interposed between the windings and such teeth (13).

The windings may be wound around each of the teeth (13) by concentrated winding. The number of the teeth (13) and the number of the slots (14) are not limited to those illustrated in the drawings, and may be less or greater than those illustrated.

The rotor (20) is located radially inside the stator (10). The rotor (20) is rotatable about the shaft (30). The rotor (20) has a peripheral surface (21) that is its outer peripheral surface. The stator (10) has a facing surface (15) radially facing the peripheral surface (21) of the rotor (20) with a gap interposed therebetween. The facing surface (15) is the inner peripheral surface of a virtual cylinder formed by connecting together the peripheral surfaces (inner peripheral surfaces) of the distant ends of the teeth (13).

The rotor (20) includes a rotor iron core (22), and permanent magnets (23, 24) embedded in the rotor iron core (22). The rotor iron core (22) is a component of the rotor (20) that forms a magnetic path of a magnetic flux generated by current flowing through the windings of the stator (10) and a magnetic path of a magnetic flux from the permanent magnets (23, 24). The stator iron core (11) includes, for example, a plurality of electrical steel sheets laminated in the axial direction. The rotor iron core (22) has magnet slots (25) that are spaces for embedding therein the permanent magnets (23, 24) respectively.

The magnet slots (25) and the permanent magnets (23, 24) respectively embedded therein form eight magnetic poles arranged in the circumferential direction. The magnet slots (25) and the permanent magnets (23, 24) respectively embedded therein are identical in shape among all of the magnetic poles.

Figure 2:
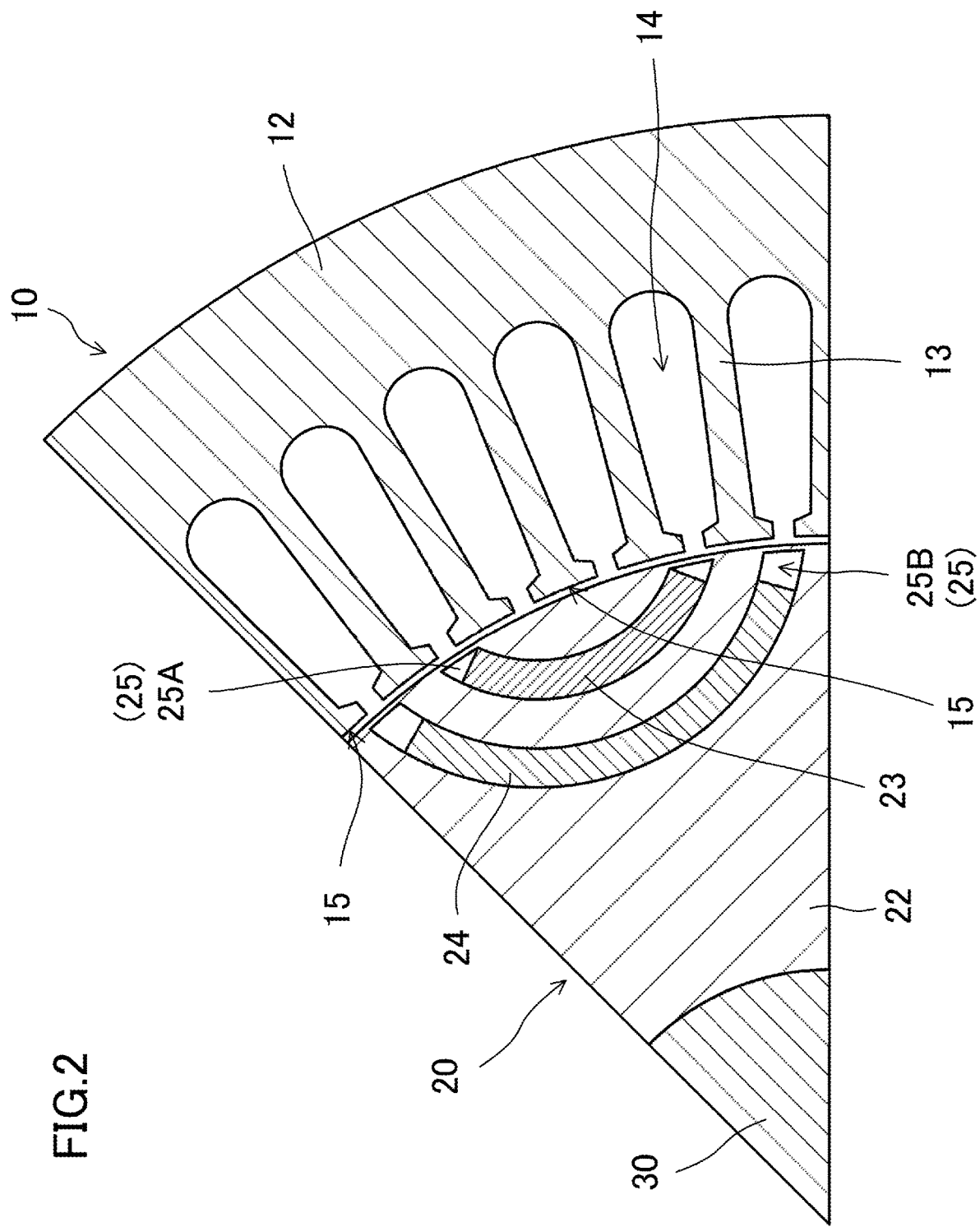
FIG. 2 is a cross-sectional view illustrating a configuration of one pole of the magnet-embedded rotating machine (1) according to the first embodiment.

As illustrated in FIG. 2, in the first embodiment, the magnet slots (25) include first magnet slots (25A) and second magnet slots (25B). FIG. 2 is an enlarged view of one pole of the rotating machine illustrated in FIG. 1. The first magnet slot (25A) is a curved groove that is curved to be more distant from the facing surface (15) of the stator (10) toward the middle of the curve. In other words, the first magnet slot (25A) is an arc-shaped groove that protrudes toward the shaft (30).

The second magnet slot (25B) is a curved groove that is curved to be more distant from the facing surface (15) of the stator (10) toward the middle of the curve. The second magnet slot (25B) is more distant from the facing surface (15) of the stator (10) than the first magnet slot (25A) is. In other words, the second magnet slot (25B) is an arc-shaped groove that protrudes toward the shaft (30), and is closer to the shaft (30) than the first magnet slot (25A) is.

A first magnet (23) is embedded in the first magnet slot (25A). A second magnet (24) is embedded in the second magnet slot (25B). The relations of formulae (1) to (8) described below hold true between the first and second magnets (23) and (24). According to this configuration, the first magnet (23) is embedded in an area that is radially distant from the facing surface (15) of the stator (10) by a first distance or longer. Meanwhile, the second magnet (24) is embedded in an area that is radially distant from the facing surface (15) of the stator (10) by a second distance or longer, the second distance being longer than the first distance.

1-2. Characteristics of Magnets

The characteristics of the first and second magnets (23) and (24) will be described in detail below.

Figure 3:
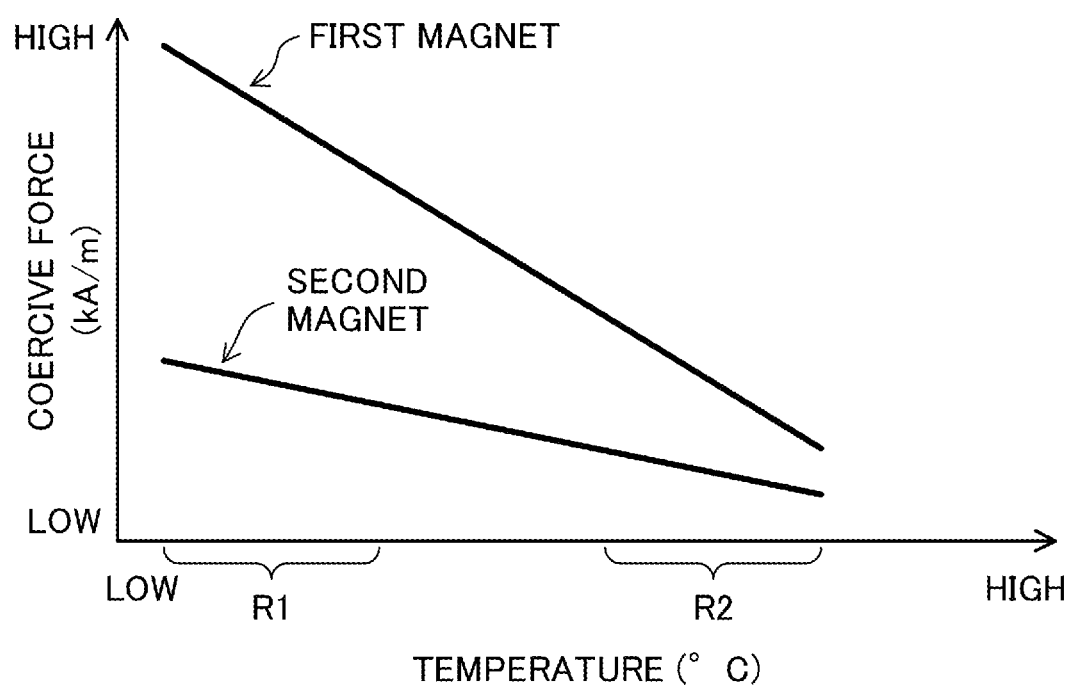
FIG. 3 is a graph showing the correlation between the temperature and coercive force of each of first and second magnets.

Plotting the magnet temperature (t) on the horizontal axis against the coercive force (H) on the vertical axis gives the graph in FIG. 3. FIG. 3 is a graph showing the temperature-coercive force characteristics of the magnets.

As shown in FIG. 3, the following formulae hold true:

$$Hco(A) > Hco(B) \qquad (1),$$

$$Hci(A) > Hci(B) \qquad (2),$$

$$Hco(A) > Hci(A) \qquad (3), \text{ and}$$

$$\{Hco(A)/Hci(A)\} > \{Hco(B)/Hci(B)\} \qquad (4),$$

where $Hco(A)$ represents the coercive force of the first magnet (23) within a first temperature range (R1) corresponding to temperatures at the startup of the rotating machine (1), $Hco(B)$ represents the coercive force of the first magnet (23) within a second temperature range (R2) corresponding to temperatures during steady-state driving of the rotating machine (1), $Hci(A)$ represents the coercive force of the second magnet (24) within the first temperature range (R1), and $Hci(B)$ represents the coercive force of the second magnet (24) within the second temperature range (R2).

That is, as indicated by the formula (1), the coercive force $Hco(A)$ of the first magnet (23) within the first temperature range (R1) is higher than the coercive force $Hco(B)$ of the first magnet (23) within the second temperature range (R2). As indicated by the formula (2), the coercive force $Hci(A)$ of the second magnet (24) within the first temperature range (R1) is higher than the coercive force $Hci(B)$ of the second magnet (24) within the second temperature range (R2).

As indicated by the formula (3), the coercive force $Hco(A)$ of the first magnet (23) within the first temperature range (R1) is higher than the coercive force $Hci(A)$ of the second magnet (24) within the first temperature range (R1). In this embodiment, the difference between the coercive forces $Hco(A)$ and $Hci(A)$ is significantly larger than the difference between the coercive forces $Hco(B)$ and $Hci(B)$.

Further, as indicated by the formula (4), the ratio of the coercive force $Hco(A)$ to the coercive force $Hci(A)$ is larger than the ratio of the coercive force $Hco(B)$ to the coercive force $Hci(B)$.

Here, the first temperature range (R1) is, for example, between −20° C. and 40° C. inclusive, and the second temperature range (R2) is, for example, between 100° C. and 200° C. inclusive. However, the second temperature range may be set in a wider range, as long as the temperature range at the startup of the rotating machine (1) is excluded therefrom, and may be ranged up to the temperature limited by a temperature limiter as its upper limit.

Employing the first and second magnets (23) and (24) having such characteristics as described above for the rotating machine (1) ensures that the coercive force is at a certain level or higher during steady-state driving of the rotating machine (1), while both the first magnet (23) and the second magnet (24) are exposed to high temperature. In addition, the second magnet (24) is embedded at a greater depth from the facing surface (15) of the stator (10) than the first magnet (23), so that the magnetization of the second magnet (24) would be difficult while the reverse magnetic field exposure and the consequent demagnetization of such second magnet (24) would be also more difficult than those of the first magnet (23) at the startup of the rotating machine (1). However, in this embodiment, employing the first and second magnets (23) and (24) satisfying the formulae (1) to (4) can reduce the difficulty in magnetization of the second magnet (24) as such.

The correlation between the magnet temperature (t) and the coercive force (Hco) of the first magnet (23) is approximated by the following formula:

$$Hco(t1)=Hco(t0)\{1-\beta o(t1-t0)\} \quad (5)$$

where t1 and t0 represent temperatures.

The correlation between the magnet temperature (t) and the coercive force (Hci) of the second magnet (24) is approximated by the following formula:

$$Hci(t1)=Hci(t0)\{1-\beta i(t1-t0)\} \quad (6)$$

where t1 and t0 represent temperatures.

Furthermore, in this embodiment, the following formula holds true for the formulae (5) and (6).

$$\beta o > \beta i > 0 \quad (7).$$

That is, as shown in FIG. 3, the absolute value of the gradient of the plotted correlation between the temperature and coercive force of the first magnet (23) is greater than the absolute value of the gradient of the plotted correlation between the temperature and coercive force of the second magnet (24). In other words, the absolute value of the temperature coefficient in the formula (5) is greater than the absolute value of the temperature coefficient in the formula (6).

Here, in general, an operation for magnetizing a magnet is performed at a temperature that is much lower than the temperature to which the magnet is exposed during the steady-state driving of a rotating machine. In this embodiment, employing permanent magnets satisfying the formulae (1) to (7) as the first and second magnets (23) and (24) can significantly reduce the difficulty in magnetization of the second magnet (24) while ensuring the coercive force required during the steady-state driving of the rotating machine. The magnetizing operation is performed through energization of the stator (10) or a dedicated magnetizing yoke.

In addition, the first and second magnets (23) and (24) of this embodiment satisfy the following formula.

$$Hco(B)>Hci(B) \quad (8)$$

This makes it possible that the coercive force of the first magnet (23) during the steady-state driving of the rotating machine is higher than that of the second magnet (24) during the steady-state driving of the rotating machine. Thus, even if the first and second magnets (23) and (24) are exposed to high temperature during the steady-state driving of the rotating machine (1), their coercive forces can be appropriately maintained in accordance with the positions of these magnets.

As described above, in this embodiment, the first magnet (23) is embedded in the first magnet slot (first pattern) (25A) that is curved to be more distant from the facing surface (15) of the stator (10) toward the middle of the curve. The second magnet (24) is embedded in the second magnet slot (second pattern) (25B) that is curved to be more distant from the facing surface (15) of the stator (10) toward the middle of the curve and that is more distant from the facing surface (15) of the stator (10) than the first magnet slot (25A) is. With this configuration, the first magnet (23) is embedded in an area that is radially distant from the facing surface (15) of the stator (10) by the first distance or longer, and the second magnet (24) is embedded in an area that is radially distant from the facing surface (15) of the stator (10) by the second distance or longer, the second distance being longer than the first distance. The relations of the formulae (1) to (8) described above hold true between the first and second magnets (23) and (24). This allows the permanent magnets (23, 24) to have appropriate coercive forces accordingly for the layout pattern of the permanent magnets (23, 24) in the rotor (20). As a result, the demagnetization resistance and the magnetization can be both achieved.

1-3. Specific Examples of Magnets

Various known magnets may be employable as the first and second magnets (23) and (24). For example, a neodymium magnet and a samarium-cobalt magnet may be employed as the first and second magnets (23) and (24), respectively. As an alternative, it may be so configured that the first magnet (23) is a neodymium magnet, while the second magnet (24) is a magnet in which a portion of neodymium in the neodymium magnet is replaced with lanthanum or cerium. Replacing neodymium, which is an expensive rare earth, with lanthanum or cerium, which is inexpensive and easily available among rare earths can reduce costs while allowing the magnet to maintain its heat resistance and its coercive force to some extent.

It may be so configured that the first magnet (23) is a magnet in which a relatively small amount of neodymium is replaced with lanthanum or cerium, while the second magnet (24) is a magnet in which a relatively large amount of neodymium is replaced with lanthanum or cerium.

As an alternative, it may be so configured that the first magnet (23) is a magnet in which a portion of neodymium is replaced with lanthanum or cerium, while the second magnet (24) is a samarium-cobalt magnet.

Second Embodiment

Figure 4:
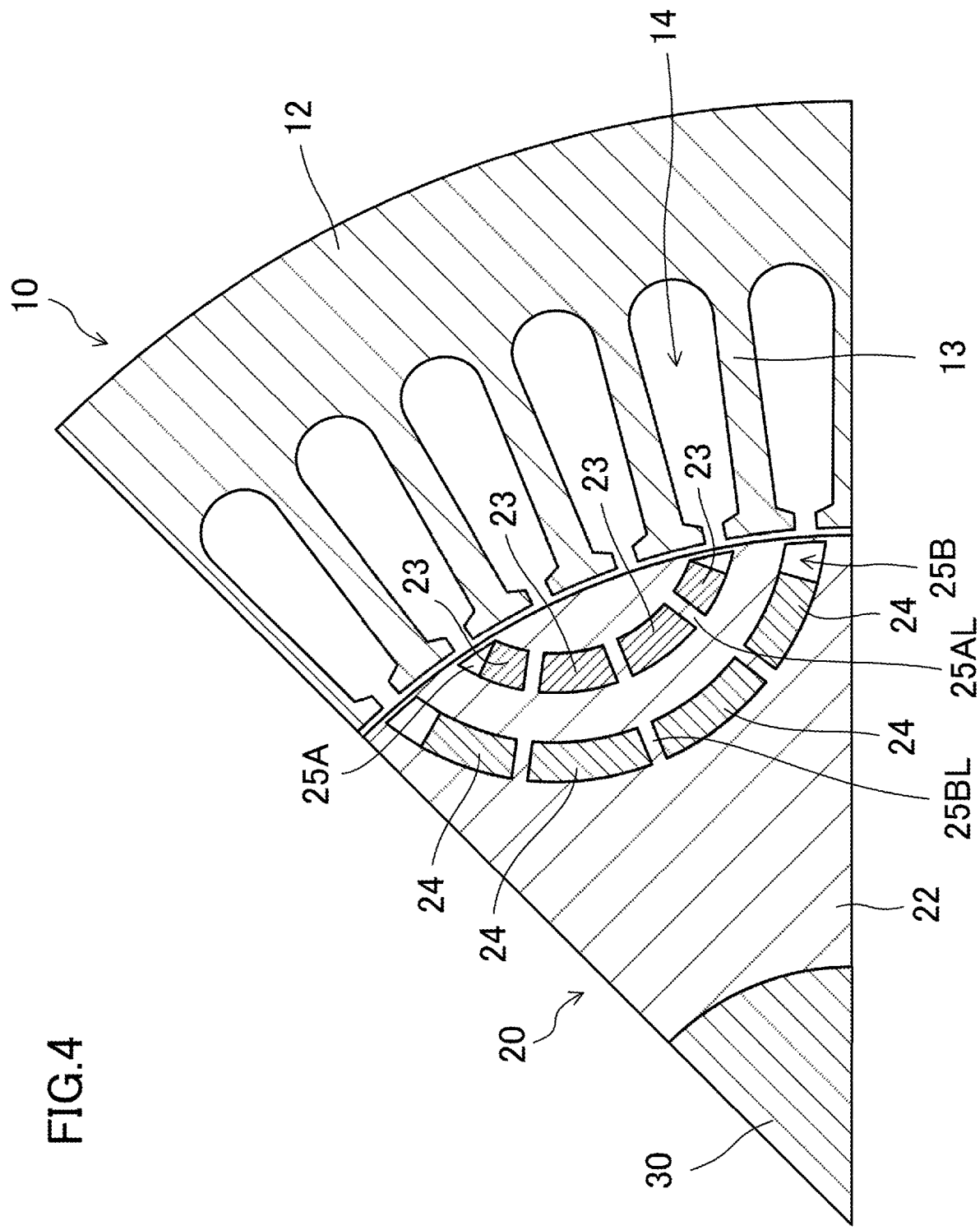
FIG. 4 is a cross-sectional view illustrating a configuration of one pole of a magnet-embedded rotating machine (1) according to a second embodiment.

A configuration of a rotating machine (1) according to a second embodiment will be described below with reference to FIG. 4. FIG. 4 is a cross-sectional view showing a configuration of one pole of the magnet-embedded rotating machine (1) according to the second embodiment.

The rotating machine (1) according to the second embodiment is different from the rotating machine (1) according to the first embodiment in that each of the first and second magnet slots (25A) and (25B) of the rotor (20) is divided into a plurality of regions by ribs.

A circumferentially intermediate portion of the first magnet slot (25A) according to the second embodiment is provided with three first ribs (25AL). The three first ribs (25AL) connect with each other a portion of the rotor iron core (22) between the outer periphery thereof and the first magnet slot (25A) and a portion of the rotor iron core (22) between the inner periphery thereof and the first magnet slot (25A). The three first ribs (25AL) are provided at intervals in the circumferential direction. The first magnet (23) is disposed in each of (four) regions into which the first magnet slot (25A) is partitioned by the first ribs (25AL).

A circumferentially intermediate portion of the second magnet slot (25B) according to the second embodiment is provided with three second ribs (25BL). The three second ribs (25BL) connect with each other a portion of the rotor iron core (22) between the outer periphery thereof and the second magnet slot (25B) and a portion of the rotor iron core (22) between the inner periphery thereof and the second magnet slot (25B). The three second ribs (25BL) are provided at intervals in the circumferential direction. The second magnet (24) is disposed in each of (four) regions into which the second magnet slot (25B) is partitioned by the second ribs (25BL).

In other words, the rotor iron core (22) is provided with a first pattern and a second pattern, each of which has a plurality of holes and thin steel sheets (ribs) alternately arranged. The first magnet (23) is embedded in each of the holes in the first pattern, and the second magnet (24) is embedded in each of the holes in the second pattern.

As described above, in the second embodiment, the first magnets (23) are embedded in each first magnet slot (first pattern) (25A) that is arranged in a substantially curved shape that is more distant from the facing surface (15) of the stator (10) toward the middle of the curve. The second magnets (24) are embedded in each second magnet slot (second pattern) (25B) that is arranged in a substantially curved shape that is more distant from the facing surface (15) of the stator (10) toward the middle of the curve, the second magnet slot (24B) being more distant from the facing surface (15) of the stator (10) than the first magnet slot (25A) is. With this configuration, the first magnets (23) are embedded in an area that is radially distant from the facing surface (15) of the stator (10) by the first distance or longer, and the second magnets (24) are embedded in an area that is radially distant from the facing surface (15) of the stator (10) by the second distance or longer. The relations of the formulae (1) to (8) described above hold true between the first and second magnets (23) and (24). This allows the permanent magnets (23, 24) to have appropriate coercive forces accordingly for the layout pattern of the permanent magnets (23, 24) in the rotor (20). As a result, the demagnetization resistance and the magnetization can be both achieved.

Third Embodiment

Figure 5:
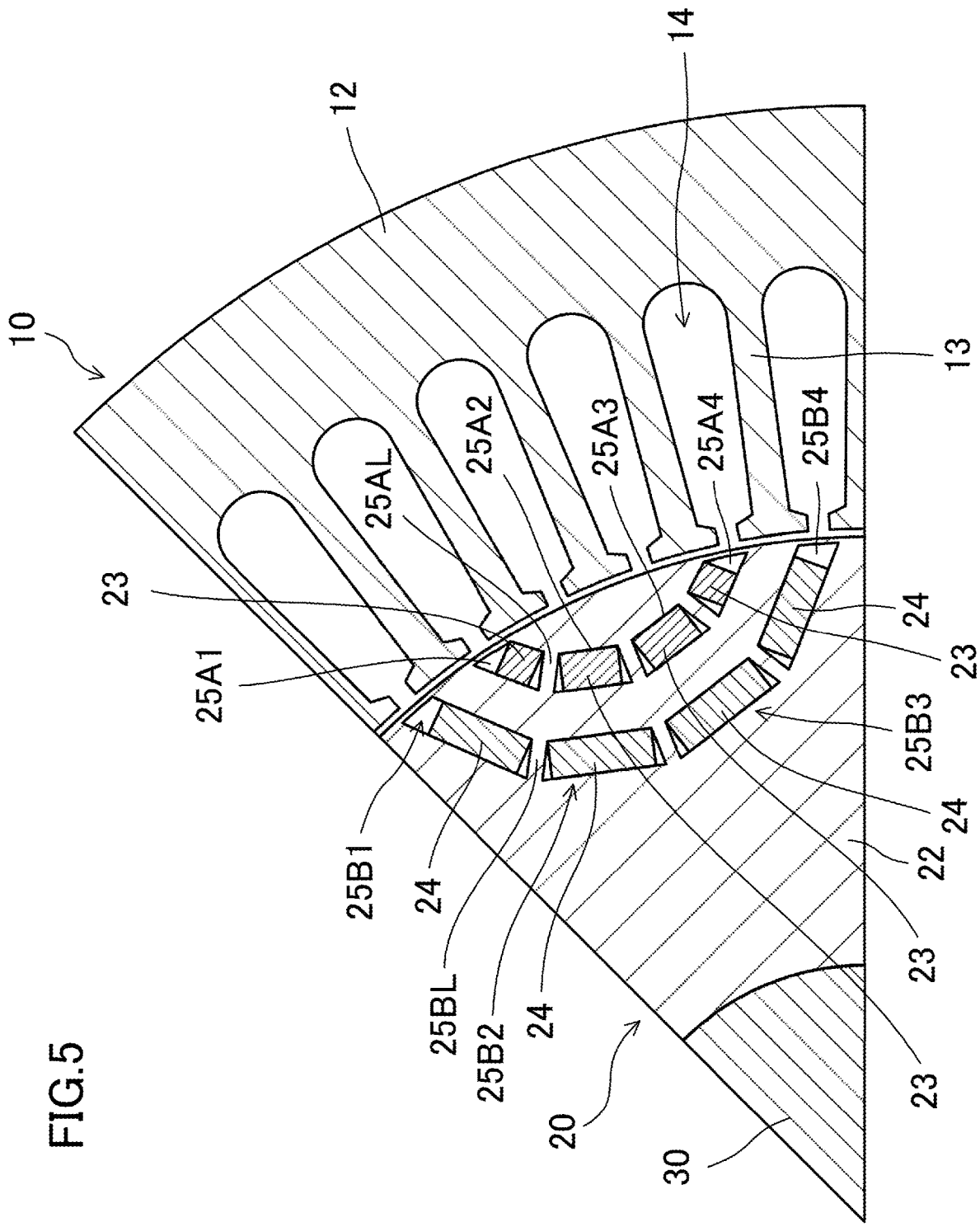
FIG. 5 is a cross-sectional view illustrating a configuration of one pole of a magnet-embedded rotating machine (1) according to a third embodiment.

A configuration of a rotating machine (1) according to a third embodiment will be described below with reference to FIG. 5. FIG. 5 is a cross-sectional view showing a configuration of one pole of the magnet-embedded rotating machine (1) according to the third embodiment.

The rotating machine (1) according to the third embodiment is different from the rotating machine (1) according to the second embodiment in that a plurality of partition slots (25A1, 25A2, 25A3, 25A4) into which the first magnet slot (25A) is partitioned by first ribs (25AL) are straight lines in shape extending longitudinally, and that a plurality of partition slots (25B1, 25B2, 25B3, 25B4) into which the second magnet slot (25B) is partitioned by second ribs (25BL) are straight lines in shape extending longitudinally.

A first magnet (23) is disposed in each of the partition slots (25A1, 25A2, 25A3, 25A4) of the first magnet slot (25A). The first magnet (23) according to the third embodiment has a rectangular cross section taken along the axial direction, and there are gaps between the first magnet (23) and the partition slot in which the first magnet is disposed.

A second magnet (24) is disposed in each of the partition slots (25B1, 25B2, 25B3, 25B4) of the second magnet slot (25B). The second magnet (24) according to the third embodiment has a rectangular cross section taken along the axial direction, and there are gaps between the second magnet (24) and the partition slot in which the second magnet is disposed.

As described above, in the third embodiment, the first magnets (23) are embedded in each first magnet slot (first pattern) (25A) that is arranged in a substantially curved shape so as to be more distant from the facing surface (15) of the stator (10) toward the middle of the curve. The second magnets (24) are embedded in each second magnet slot (second pattern) (25B) that is arranged in a substantially curved shape so as to be more distant from the facing surface (15) of the stator (10) toward the middle of the curve, the second magnet slot (25B) being more distant from the facing surface (15) of the stator (10) than the first magnet slot (25A) is. The relations of the formulae (1) to (8) described above hold true between the first and second magnets (23) and (24). This allows the permanent magnets (23, 24) to have appropriate coercive forces accordingly for the layout pattern of the permanent magnets (23, 24) in the rotor (20). As a result, the demagnetization resistance and the magnetization can be both achieved.

Fourth Embodiment

Figure 6:
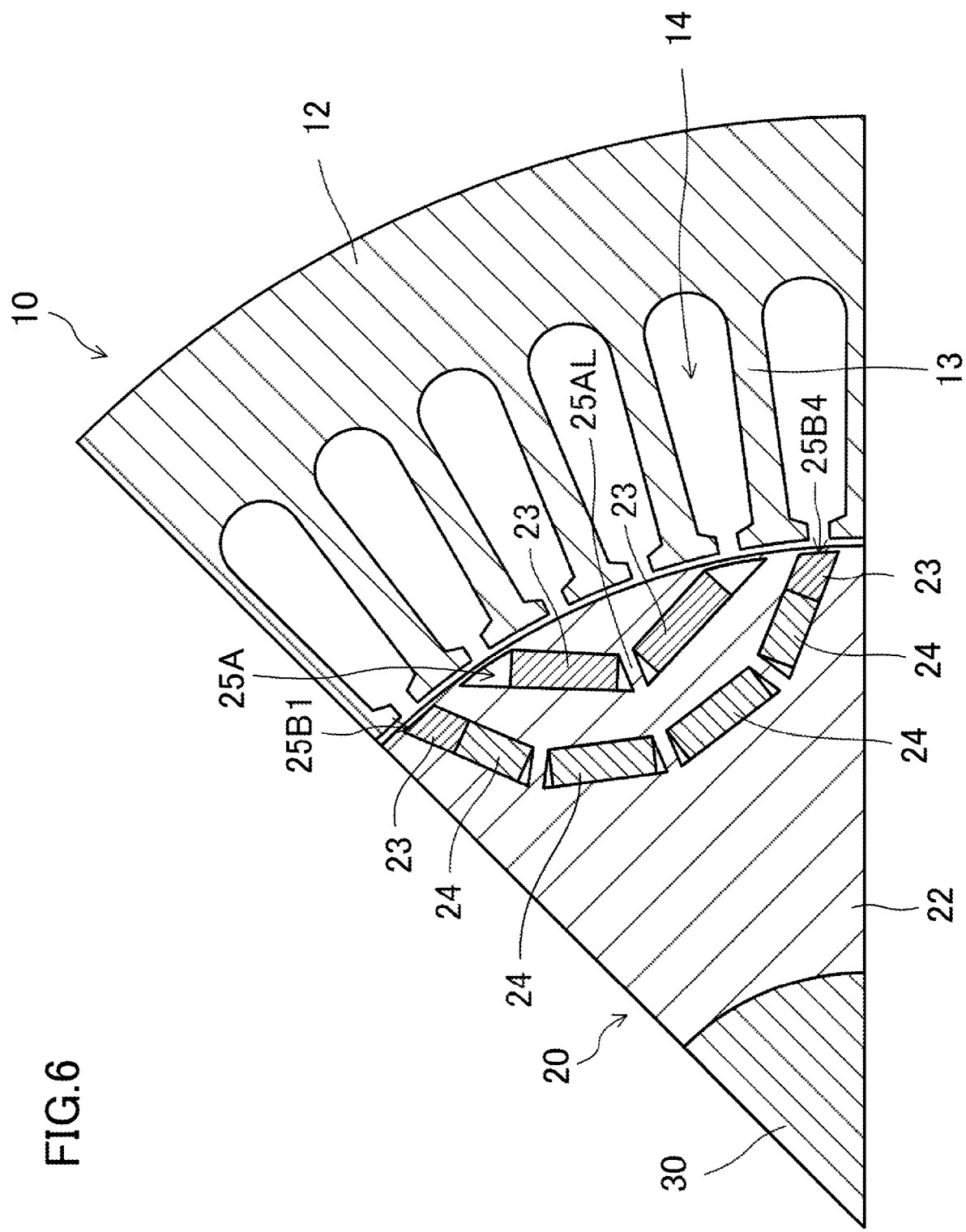
FIG. 6 is a cross-sectional view illustrating a configuration of one pole of a magnet-embedded rotating machine (1) according to a fourth embodiment.

A configuration of a rotating machine (1) according to a fourth embodiment will be described below with reference to FIG. 6. FIG. 6 is a cross-sectional view showing a configuration of one pole of the magnet-embedded rotating machine (1) according to the fourth embodiment.

The rotating machine (1) according to the fourth embodiment is different from the rotating machine (1) according to the third embodiment in that the first magnet slot (25A) is partitioned into two regions by one rib (25AL). In addition, unlike the rotating machine (1) according to the third embodiment, first and second magnets (23) and (24) are both disposed in each of the partition slots (25B1, 25B4) located at both circumferential ends of the second magnet slot (25B).

The first and second magnets (23) and (24) are both disposed adjacently in the circumferential direction in each of the partition slots (25B1, 25B4) located at either circumferential end of the second magnet slot (25B). More specifically, the first magnet (23) and the second magnet (24) are disposed in the partition slot (25B1, 25B4) in such a way that the first magnet (23) is on the side closer to either end of the second magnet slot (25B) and the second magnet (24) is closer to the middle of the second magnet slot (25B) than the first magnet (23) is.

As described above, according to the fourth embodiment, the first magnets (23) are embedded in an area of the rotor (20) that is radially distant from the facing surface (15) of the stator (10) by the first distance or longer, and the second magnets (24) are embedded in an area of the rotor (20) that is radially distant from the facing surface (15) of the stator (10) by the second distance or longer.

That is to say, in the fourth embodiment, the distances from the facing surface (15) of the stator (10) to the first magnets (23) are longer than or equal to the first distance but shorter than the second distance. The distances from the facing surface (15) of the stator (10) to the second magnets (24) are longer than or equal to the second distance. The second distance is longer than the first distance.

This allows the permanent magnets (23, 24) to have appropriate coercive forces accordingly for the layout pattern of the permanent magnets (23, 24) in the rotor (20). As a result, the demagnetization resistance and the magnetization can be both achieved.

Fifth Embodiment

Figure 7:
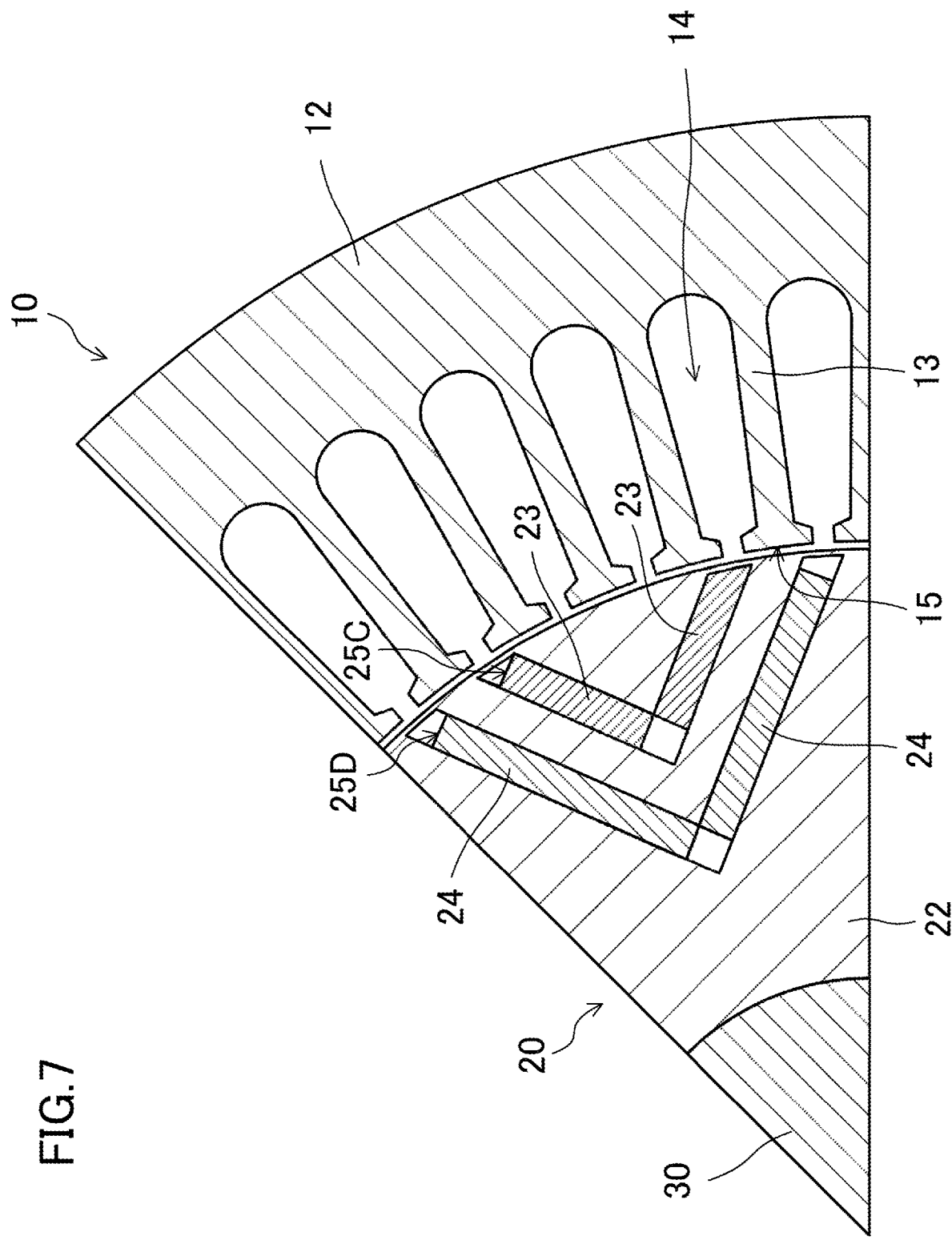
FIG. 7 is a cross-sectional view illustrating a configuration of one pole of a magnet-embedded rotating machine (1) according to a fifth embodiment.

A configuration of a rotating machine (1) according to a fifth embodiment will be described below with reference to FIG. 7. FIG. 7 is a cross-sectional view showing a configuration of one pole of the magnet-embedded rotating machine (1) according to the fifth embodiment.

The rotating machine (1) according to the fifth embodiment is different from the rotating machine (1) according to the first embodiment in that the rotating machine (1) includes third magnet slots (25C) and fourth magnet slots (25D) as magnet slots (25).

Each third magnet slot (25C) is arranged to be more distant from the facing surface (15) of the stator (10) towards the middle of the third magnet slot (25° C.), forming a shape of a bent line. In other words, the third magnet slot (25C) is a V-shaped groove that is pointed toward the shaft (30) as viewed in the axial direction. Two first magnets (23) are disposed along respective sides of this V shape. In the fifth embodiment, the apex of the V shape forms a gap.

Each fourth magnet slot (25D) is arranged to be more distant from the facing surface (15) of the stator (10) toward the middle of the fourth magnet slot (25D), forming a shape of a bent line. In other words, the fourth magnet slot (25D) is a V-shaped groove that is pointed toward the shaft (30) as viewed in the axial direction. Two second magnets (24) are disposed along respective sides of this V shape. In the fifth embodiment, the apex of the V shape forms a gap.

As described above, in the fifth embodiment, the first magnets (23) are embedded in the respective third magnet slots (first pattern) (25° C.) each arranged to be more distant from the facing surface (15) of the stator (10) toward the middle of the third magnet slot (first pattern) (25C), forming a shape of a bent line. The second magnets (24) are embedded in the respective fourth magnet slots (second pattern) (25D) each arranged to be more distant from the facing surface (15) of the stator (10) toward the middle of the fourth magnet slots (second pattern) (25D), forming a shape of a bent line, the fourth magnet slots (25D) being more distant from the facing surface (15) of the stator (10) than the third magnet slot (25C) is. With this configuration, the first magnets (23) are embedded in an area that is radially distant from the facing surface (15) of the stator (10) by a distance longer than or equal to the first distance, and the second magnets (24) are embedded in an area that is radially distant from the facing surface (15) of the stator (10) by a distance longer than or equal to the second distance. The relations of the formulae (1) to (8) described above hold true between the first and second magnets (23) and (24). This allows the permanent magnets (23, 24) to have appropriate coercive forces accordingly for the layout pattern of the permanent magnets (23, 24) in the rotor (20). As a result, the demagnetization resistance and the magnetization can be both achieved.

Sixth Embodiment

Figure 8:
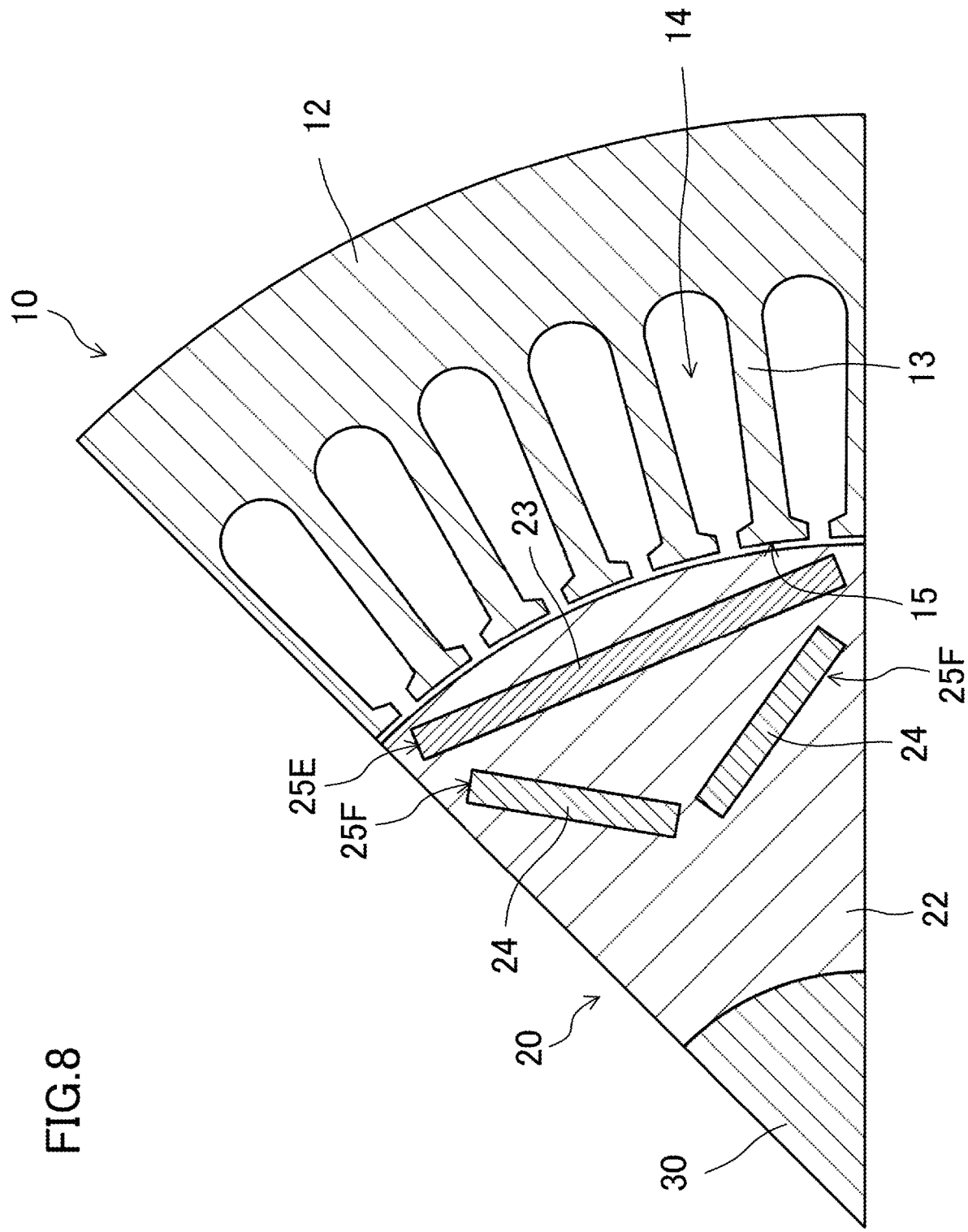
FIG. 8 is a cross-sectional view illustrating a configuration of one pole of a magnet-embedded rotating machine (1) according to a sixth embodiment.

A configuration of a rotating machine (1) according to a sixth embodiment will be described below with reference to FIG. 8. FIG. 8 is a cross-sectional view showing a configuration of one pole of the magnet-embedded rotating machine (1) according to the sixth embodiment.

The rotating machine (1) according to the sixth embodiment is distinct from the rotating machine (1) according to the first embodiment in that the rotating machine (1) includes fifth magnet slots (25E) and sixth magnet slots (25F) as magnet slots (25).

Each fifth magnet slot (25E) is arranged in the form of a straight line, extending to be more distant from the facing surface (15) of the stator (10) toward the middle of the line. In other words, the fifth magnet slot (25E) extends along the chord of the arc of the angular range of a one-pole portion of the peripheral surface (21). A first magnet (23) is disposed in the fifth magnet slot (25E) along this chord.

Each sixth magnet slot (25F) is arranged to be more distant from the facing surface (15) of the stator (10) toward the middle of the sixth magnet slot (25F), forming a shape of a bent line. More specifically, the sixth magnet slot (25F) is partitioned into two regions, which are provided along respective sides of the V-shaped groove that is pointed toward the shaft (30) as viewed in the axial direction. A second magnet (24) is disposed in each of the two regions of the sixth magnet slot (25F).

As described above, in the sixth embodiment, the first magnet (23) is embedded in the fifth magnet slot (first pattern) (25E) is arranged in the form of a straight line, extending to be more distant from the facing surface (15) of the stator (10) toward the middle of the line. The second magnets (24) are embedded in the respective sixth magnet slots (second pattern) (25F) arranged in the form of a bent line, extending to be more distant from the facing surface (15) of the stator (10) toward the middle of the line and which are more distant from the facing surface (15) of the stator (10) than the fifth magnet slot (25E) is. With this configuration, the first magnet (23) is embedded in an area that is radially distant from the facing surface (15) of the stator (10) by the first distance or longer, and the second magnets (24) are embedded in an area that is radially distant from the facing surface (15) of the stator (10) by the second distance or longer. The relations of the formulae (1) to (8) described above hold true between the first and second magnets (23) and (24). This allows the permanent magnets (23, 24) to have appropriate coercive forces accordingly for the layout pattern of the permanent magnets (23, 24) in the rotor (20). As a result, the demagnetization resistance and the magnetization can be both achieved.

Seventh Embodiment

Figure 9:
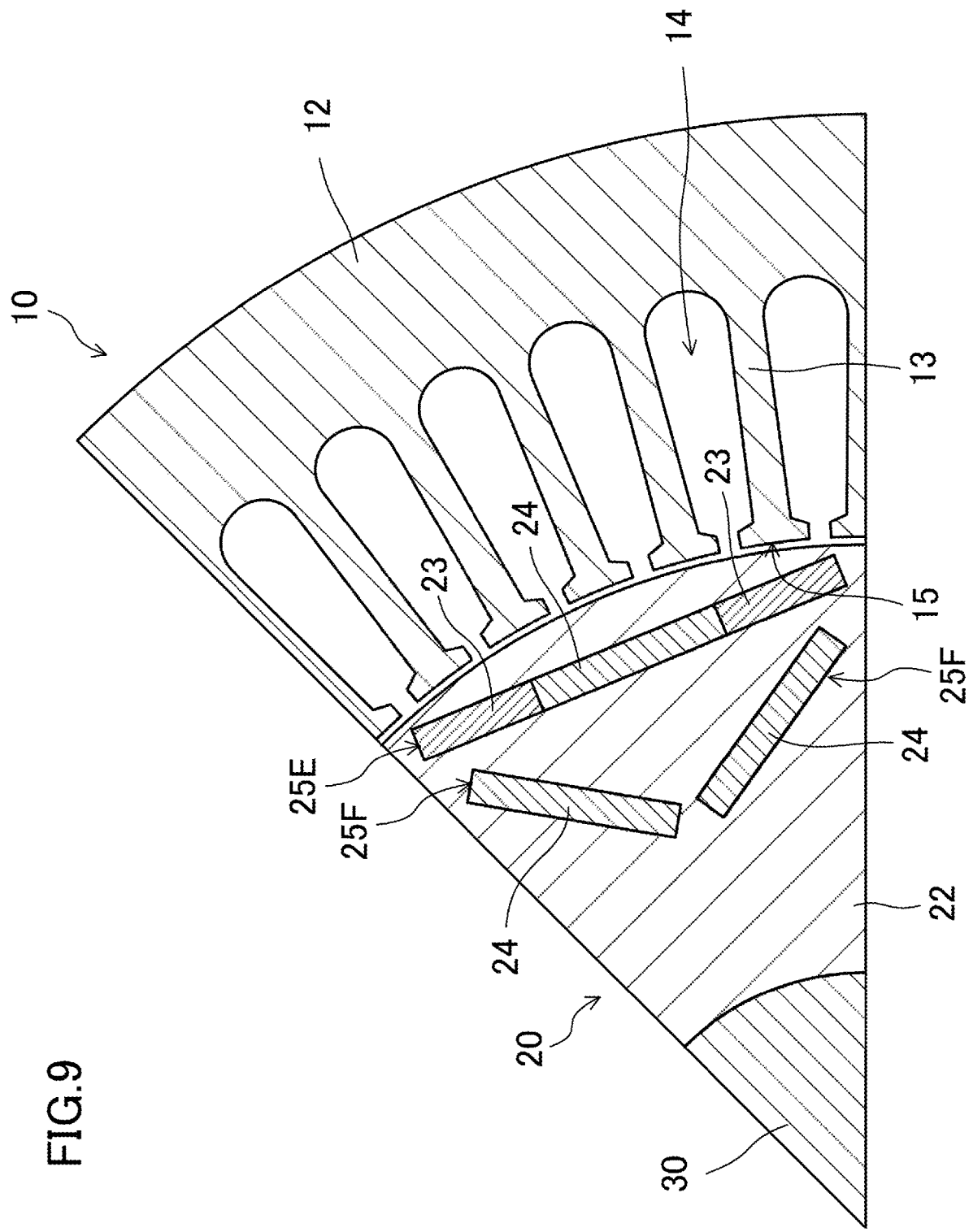
FIG. 9 is a cross-sectional view illustrating a configuration of one pole of a magnet-embedded rotating machine (1) according to a seventh embodiment.

A configuration of a rotating machine (1) according to a seventh embodiment will be described below with reference to FIG. 9. FIG. 9 is a cross-sectional view showing a configuration of one pole of the magnet-embedded rotating machine (1) according to the seventh embodiment.

The rotating machine (1) according to the seventh embodiment is different from the rotating machine (1) according to the sixth embodiment in that the rotating machine (1) includes first magnets (23) and a second magnet (24) in each of fifth magnet slots (25E).

The first magnets (23) are embedded in respective portions of each fifth magnet slot (25E). More specifically, the first magnets (23) are respectively disposed at both ends of the fifth magnet slot (25E) as viewed in the axial direction. The second magnet (24) is disposed in the fifth magnet slot (25E) so as to be positioned closer to the middle of the fifth magnet slot (25E) compared to the first magnet (23) as viewed in the axial direction.

As described above, in the seventh embodiment, the first magnets (23) are embedded in respective portions of the fifth magnet slot (third pattern) (25E) arranged in the form of a straight line, extending to be more distant from the facing surface (15) of the stator (10) toward the middle of the line. The second magnet (24) is embedded in the fifth magnet slot (25E) so as to be positioned closer to the middle of the fifth magnet slot (25E) compared to the first magnet (23). With this configuration, the first magnets (23) are embedded in an area that is radially distant from the facing surface (15) of the stator (10) by the first distance or longer, and the second magnets (24) are embedded in an area that is radially distant from the facing surface (15) of the stator (10) by the second distance or longer. The relations of the formulae (1) to (8) described above hold true between the first and second magnets (23) and (24). This allows the permanent magnets (23, 24) to have appropriate coercive forces accordingly for the layout pattern of the permanent magnets (23, 24) in the rotor (20). As a result, the demagnetization resistance and the magnetization can be both achieved.

Eighth Embodiment

Figure 10:
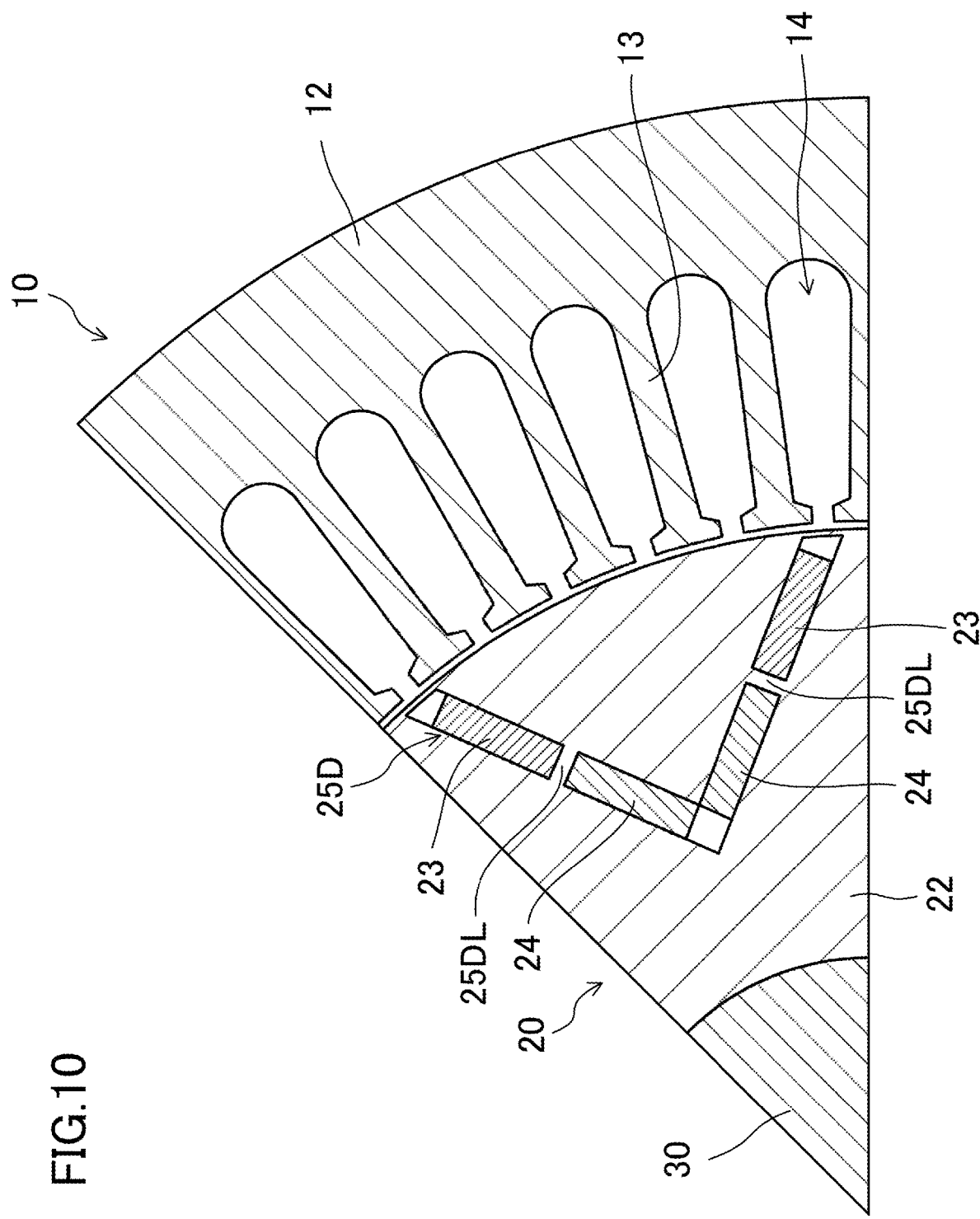
FIG. 10 is a cross-sectional view illustrating a configuration of one pole of a magnet-embedded rotating machine (1) according to an eighth embodiment.

A configuration of a rotating machine (1) according to an eighth embodiment will be described below with reference to FIG. 10. FIG. 10 is a cross-sectional view showing a configuration of one pole of the magnet-embedded rotating machine (1) according to the eighth embodiment.

The rotating machine (1) according to the eighth embodiment is different from the rotating machine (1) according to the fifth embodiment in that the rotating machine (1) includes fourth magnet slots (25D) without including any third magnet slots (25° C.). The rotating machine (1) according to the eighth embodiment is different from the rotating machine (1) according to the fifth embodiment also in that each fourth magnet slot (25D) includes two fourth ribs (25DL), and is partitioned into four partition slots.

A circumferentially intermediate portion of the fourth magnet slot (25D) according to the eighth embodiment is provided with the two fourth ribs (25DL). The two fourth ribs (25DL) connect with each other a portion of the rotor iron core (22) between the outer periphery thereof and the fourth magnet slot (25D) and a portion of the rotor iron core (22) between the inner periphery thereof and the fourth magnet slot (25D). The two fourth ribs (25DL) and the apex of the V shape of the fourth magnet slot (25D) partition the interior of the fourth magnet slot (25D) into four regions. First magnets (23) are respectively disposed in two of the four regions thus partitioned, which are located at either end of the fourth magnet slot (25D) as viewed in the axial direction. Second magnets (24) are respectively disposed in two of the four regions thus partitioned, which are intermediate ones between the first magnets (23) as viewed in the axial direction.

As described above, in the eighth embodiment, the first magnets (23) are embedded in portions of the fourth magnet slot (third pattern) (25D) arranged in the form of a bent line, extending to be more distant from the facing surface (15) of the stator (10) toward the middle of the line. The second magnets (24) are embedded in the fourth magnet slot (third pattern) (25D) so as to be positioned closer to the middle of the fourth magnet slot (25D) compared to the first magnet (23). With this configuration, the first magnets (23) are embedded in an area that is radially distant from the facing surface (15) of the stator (10) by the first distance or longer, and the second magnets (24) are embedded in an area that is radially distant from the facing surface (15) of the stator (10) by the second distance or longer. The relations of the formulae (1) to (8) described above hold true between the first and second magnets (23) and (24). This allows the permanent magnets (23, 24) to have appropriate coercive forces accordingly for the layout pattern of the permanent magnets (23, 24) in the rotor (20). As a result, the demagnetization resistance and the magnetization can be both achieved.

Ninth Embodiment

Figure 11:
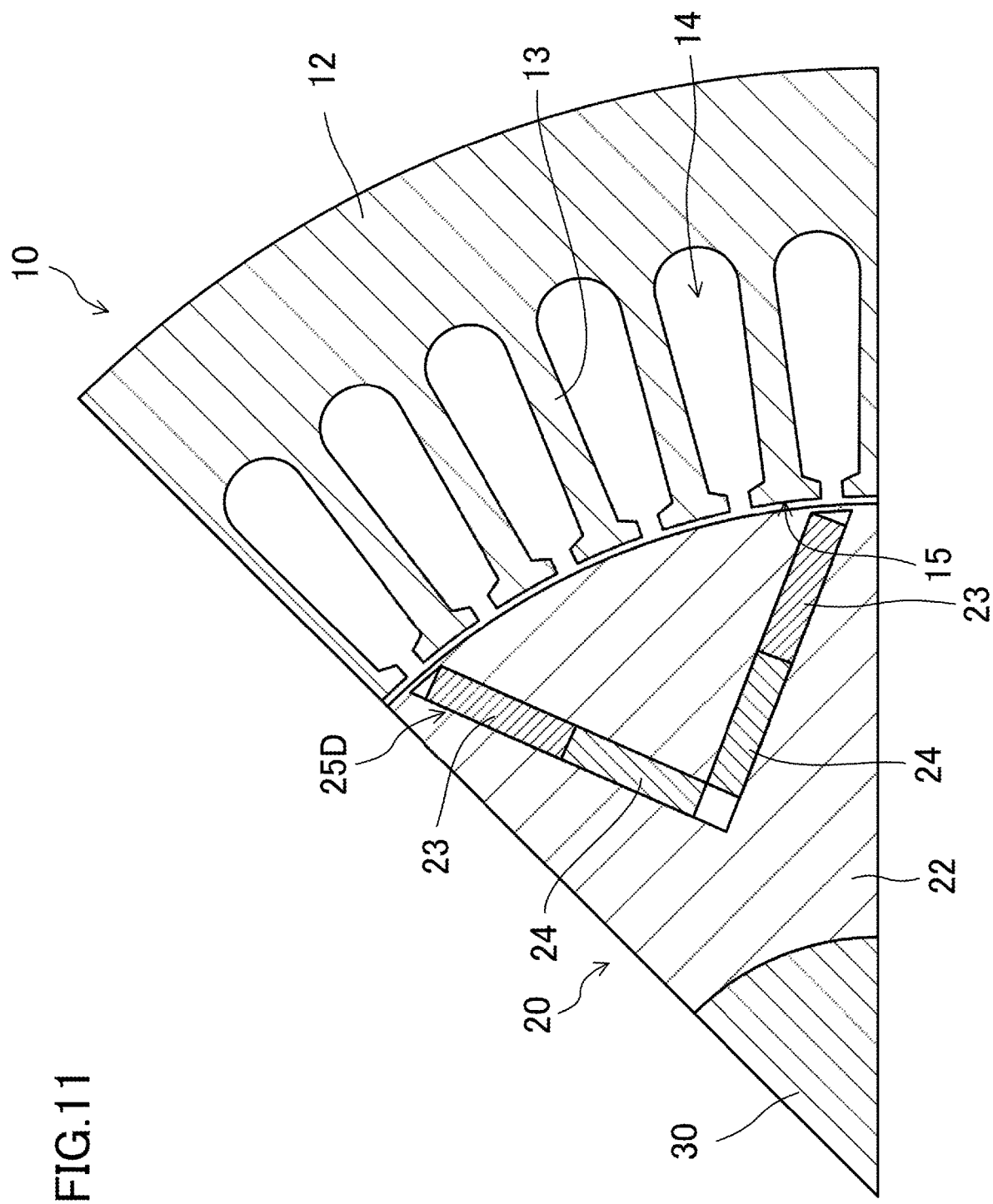
FIG. 11 is a cross-sectional view illustrating a configuration of one pole of a magnet-embedded rotating machine (1) according to a ninth embodiment.

A configuration of a rotating machine (1) according to a ninth embodiment will be described below with reference to FIG. 11. FIG. 11 is a cross-sectional view showing a configuration of one pole of the magnet-embedded rotating machine (1) according to the ninth embodiment.

The rotating machine (1) according to the ninth embodiment is different from the rotating machine (1) according to the eighth embodiment in that each of fourth magnet slots (25D) includes no fourth ribs (25DL).

In the ninth embodiment, first and second magnets (23) and (24) are provided in each side of the V shape of the fourth magnet slot (25D). More specifically, the first magnets (23) are respectively disposed in portions of the fourth magnet slot (25D), which are located at either end thereof as viewed in the axial direction. The second magnets (24) are disposed in the fourth magnet slot (25D) so as to be positioned closer to the middle of the fourth magnet slot (25D) compared to the first magnet (23) as viewed in the axial direction.

As described above, in the ninth embodiment, the first magnets (23) are embedded in portions of the fourth magnet slot (third pattern) (25D) arranged in the form of a bent line, extending to be more distant from the facing surface (15) of the stator (10) toward the middle of the line. The second magnets (24) are embedded in the fourth magnet slot (third pattern) (25D) so as to be positioned closer to the middle of the fourth magnet slot (25D) compared to the first magnet (23). With this configuration, the first magnets (23) are embedded in an area that is radially distant from the facing surface (15) of the stator (10) by the first distance or longer, and the second magnets (24) are embedded in an area that is radially distant from the facing surface (15) of the stator (10) by the second distance or longer. The relations of the formulae (1) to (8) described above hold true between the first and second magnets (23) and (24). This allows the permanent magnets (23, 24) to have appropriate coercive forces accordingly for the layout pattern of the permanent magnets (23, 24) in the rotor (20). As a result, the demagnetization resistance and the magnetization can be both achieved.

Tenth Embodiment

Figure 12:
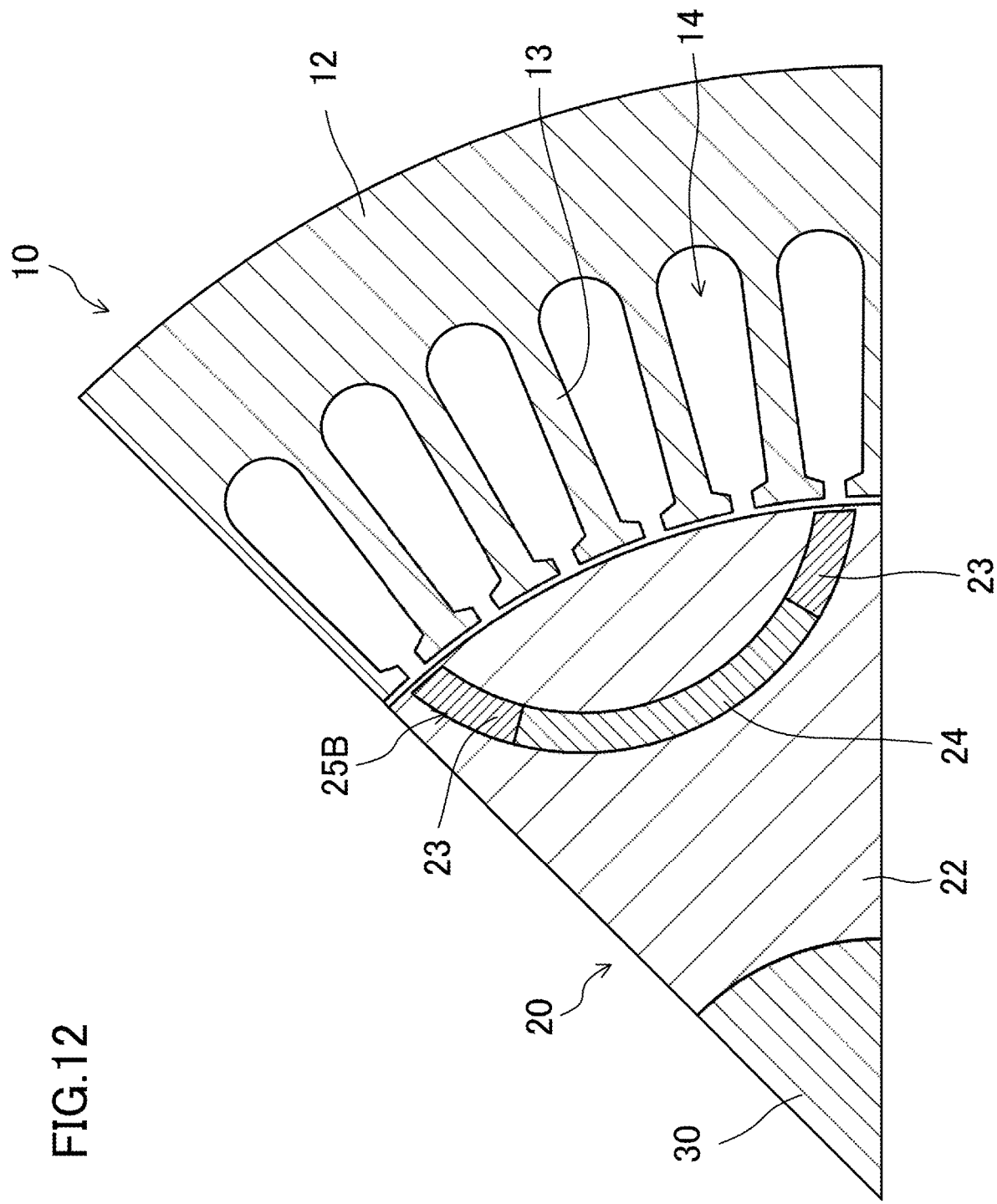
FIG. 12 is a cross-sectional view illustrating a configuration of one pole of a magnet-embedded rotating machine (1) according to a tenth embodiment.

A configuration of a rotating machine (1) according to a tenth embodiment will be described below with reference to FIG. 12. FIG. 12 is a cross-sectional view showing a configuration of one pole of the magnet-embedded rotating machine (1) according to the tenth embodiment.

The rotating machine (1) according to the tenth embodiment is different from the rotating machine (1) according to the first embodiment in that while the rotor (20) has no first magnet slots (25A) but has second magnet slots (25B). The rotating machine (1) according to the tenth embodiment is different from the rotating machine (1) according to the first embodiment in that each of the second magnet slots (25B) includes first magnets (23) and a second magnet (24).

In the tenth embodiment, the first magnets (23) and the second magnet (24) are provided along the arc of each second magnet slot (25B). More specifically, the first magnets (23) are disposed in respective portions of the second magnet slot (25B) at either end thereof as viewed in the axial direction. The second magnet (24) is disposed in the second magnet slot (25B) so as to be positioned closer to the middle of the second magnet slot (25B) compared to the first magnet (23) as viewed in the axial direction.

As described above, in the tenth embodiment, the first magnets (23) are embedded in respective portions of the second magnet slot (third pattern) (25B) arranged in the form of an arc, extending to be more distant from the facing surface (15) of the stator (10) toward the middle of the arc. The second magnet (24) is embedded disposed in the second magnet slot (third pattern) (25B) so as to be positioned closer to the middle of the second magnet slot (25B) compared to the first magnet (23). With this configuration, the first magnets (23) are embedded in an area that is radially distant from the facing surface (15) of the stator (10) by the first distance or longer, and the second magnet (24) is embedded in an area that is radially distant from the facing surface (15) of the stator (10) by the second distance or longer. The relations of the formulae (1) to (8) described above hold true between the first and second magnets (23) and (24). This allows the permanent magnets (23, 24) to have appropriate coercive forces accordingly for the layout pattern of the permanent magnets (23, 24) in the rotor (20). As a result, the demagnetization resistance and the magnetization can be both achieved.

Eleventh Embodiment

Figure 13:
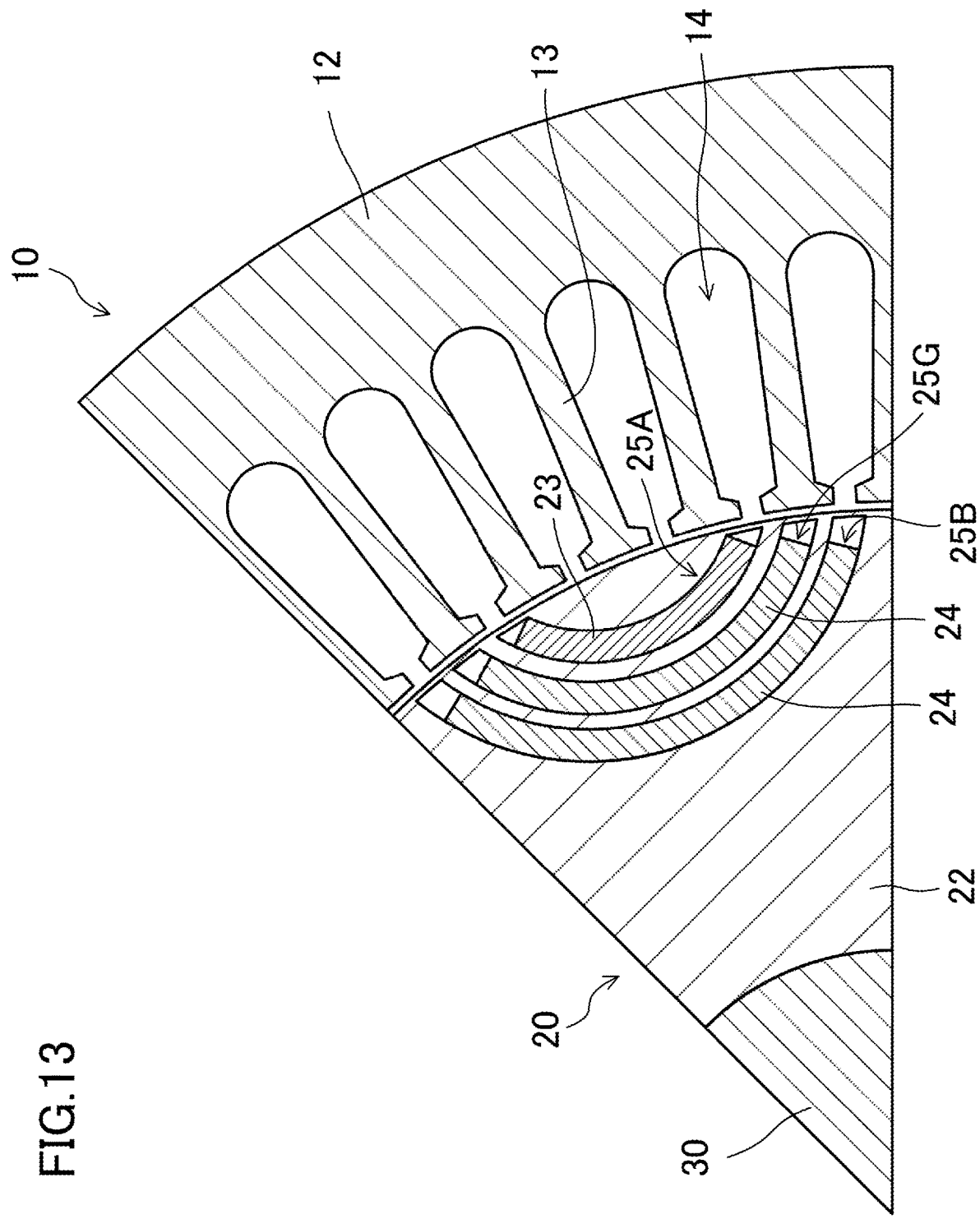
FIG. 13 is a cross-sectional view illustrating a configuration of one pole of a magnet-embedded rotating machine (1) according to an eleventh embodiment.

A configuration of a rotating machine (1) according to an eleventh embodiment will be described below with reference to FIG. 13. FIG. 13 is a cross-sectional view showing a configuration of one pole of the magnet-embedded rotating machine (1) according to the eleventh embodiment.

The rotating machine (1) according to the eleventh embodiment is different from the rotating machine (1) according to the first embodiment in that the rotor (20) has seventh magnet slots (25G) in addition to the first magnet slots (25A) and the second magnet slots (25B).

Each seventh magnet slot (25G) is provided between the first magnet slot (25A) and the second magnet slot (25B) as viewed in the axial direction. In other words, the seventh magnet slot (25G) is disposed between the first magnet slot (25A) and the second magnet slot (25B) in the radial direction.

A first magnet (23) is disposed in the first magnet slot (25A). A second magnet (24) is disposed in the second magnet slot (25B). Another second magnet (24) is disposed in the seventh magnet slot (25G).

As described above, in the eleventh embodiment, the first magnet (23) is embedded in the first magnet slot (first pattern) (25A) arranged in the form of an arc, extending to be more distant from the facing surface (15) of the stator (10) toward the middle of the arc. The second magnets (24) are each embedded respectively in the second magnet slot (25B) and the seventh magnet slot (25G) (second patterns) arranged in the forms of arcs, extending to be more distant from the facing surface (15) of the stator (10) toward the middles of the arcs, and which are more distant from the facing surface (15) of the stator (10) than the first magnet slot (first pattern) (25A). With this configuration, the first magnet (23) is embedded in an area that is radially distant from the facing surface (15) of the stator (10) by the first distance or longer, and the second magnets (24) are embedded in an area that is radially distant from the facing surface (15) of the stator (10) by the second distance or longer. The relations of the formulae (1) to (8) described above hold true between the first and second magnets (23) and (24). This allows the permanent magnets (23, 24) to have appropriate coercive forces accordingly for the layout pattern of the permanent magnets (23, 24) in the rotor (20). As a result, the demagnetization resistance and the magnetization can be both achieved.

While the exemplary embodiments of the present disclosure have been described above, the present disclosure is not limited to the embodiments.

The present disclosure is not limited to the embodiments illustratively described with the rotor (20) including eight magnetic poles. The number of the magnetic poles of the rotor (20) may be seven or less, or nine or more.

The present disclosure is not limited to the embodiments illustratively described with the rotating machine (1) in which the rotor (20) is located nearer to the inner periphery and the stator (10) is located nearer to the outer periphery. As an alternative, the stator may be located nearer to the inner periphery of the rotating machine, and the rotor may be located nearer to the outer periphery of the rotating machine.

A rotating machine may include two or more combinations of magnets (first and second magnets) satisfying the formulae (1) to (8) with three or more types of magnets disposed in such a layout pattern of magnets as illustrated FIG. 13, in such a way that the magnets adjacent to each other in the radial direction satisfy the relation between the first and second magnets.

The elements described in the above embodiments and variations may be combined as appropriate, as long as any contradictions will not occur.

The present disclosure is usefully appliable to a rotating machine.

The invention claimed is:
1. A magnet-embedded rotating machine comprising:
a rotor rotatable about a shaft; and
a stator having a facing surface radially facing a peripheral surface of the rotor with a gap interposed therebetween,
the rotor including
a first magnet embedded in an area that is radially spaced from the facing surface of the stator by a first distance or longer, and
a second magnet embedded in an area that is radially spaced from the facing surface of the stator by a second distance or longer, the second distance being longer than the first distance,

$Hco(A) > Hco(B)$, $Hci(A) > Hci(B)$, $Hco(A) > Hci(A)$, and $\{Hco(A)/Hci(A)\} > \{Hco(B)/Hci(B)\}$, with Hco(A) representing a coercive force of the first magnet within a first temperature range corresponding to temperatures at a startup of the rotating machine,
Hco(B) representing a coercive force of the first magnet within a second temperature range corresponding to temperatures during steady-state driving of the rotating machine, Hci(A) representing a coercive force of the second magnet within the first temperature range, Hci(B) representing a coercive force of the second magnet within the second temperature range, the first magnet being a neodymium magnet, or a neodymium magnet in which a portion of neodymium is replaced with lanthanum or cerium, and the second magnet being a samarium-cobalt magnet, or a neodymium magnet in which a portion of neodymium is replaced with lanthanum or cerium.

2. The magnet-embedded rotating machine of claim 1, wherein $$Hco(t1)=Hco(t0)\{1-\beta o(t1-t0)\},$$

$$Hci(t1)=Hci(t0)\{1-\beta i(t1-t0)\},$$

t1 and t0 represent temperatures,

βo and βi represent temperature coefficients of the coercive force of the first and second magnets respectively and $$\beta o > \beta i > 0.$$

3. The magnet-embedded rotating machine of claim 2, wherein Hco(B)>Hci(B).

4. The magnet-embedded rotating machine of claim 2, wherein the first temperature range is from −20° C. to 40° C., and the second temperature range is from 100° C. to 200° C.

5. The magnet-embedded rotating machine of claim 2, wherein the first magnet is embedded in a first pattern arranged in a form of a straight line, a bent line, or a curve, extending to be more distant from the facing surface of the stator toward the middle of the first pattern, and the second magnet is embedded in a second pattern arranged in a form of a bent line or a curve, extending to be more distant from the facing surface of the stator toward the middle of the second pattern, the second pattern being more distant from the facing surface of the stator than the first pattern.

6. The magnet-embedded rotating machine of claim 2, wherein the first magnet is embedded in portions of a third pattern arranged in a form of a straight line, a bent line, or a curve, extending to be more distant from the facing surface of the stator toward the middle of the third pattern, and the second magnet is embedded in the third pattern so as to be positioned closer to the middle of the third pattern compared to the first magnet.

7. The magnet-embedded rotating machine of claim 1, wherein Hco(B)>Hci(B).

8. The magnet-embedded rotating machine of claim 3, wherein the first temperature range is from −20° C. to 40° C., and the second temperature range is from 100° C. to 200° C.

9. The magnet-embedded rotating machine of claim 7, wherein the first magnet is embedded in a first pattern arranged in a form of a straight line, a bent line, or a curve, extending to be more distant from the facing surface of the stator toward the middle of the first pattern, and the second magnet is embedded in a second pattern arranged in a form of a bent line or a curve, extending to be more distant from the facing surface of the stator toward the middle of the second pattern, the second pattern being more distant from the facing surface of the stator than the first pattern.

10. The magnet-embedded rotating machine of claim 7, wherein the first magnet is embedded in portions of a third pattern arranged in a form of a straight line, a bent line, or a curve, extending to be more distant from the facing surface of the stator toward the middle of the third pattern, and the second magnet is embedded in the third pattern so as to be positioned closer to the middle of the third pattern compared to the first magnet.

11. The magnet-embedded rotating machine of claim 1, wherein the first temperature range is from −20° C. to 40° C., and the second temperature range is from 100° C. to 200° C.

12. The magnet-embedded rotating machine of claim 11, wherein the first magnet is embedded in a first pattern arranged in a form of a straight line, a bent line, or a curve, extending to be more distant from the facing surface of the stator toward the middle of the first pattern, and the second magnet is embedded in a second pattern arranged in a form of a bent line or a curve, extending to be more distant from the facing surface of the stator toward the middle of the second pattern, the second pattern being more distant from the facing surface of the stator than the first pattern.

13. The magnet-embedded rotating machine of claim 11, wherein the first magnet is embedded in portions of a third pattern arranged in a form of a straight line, a bent line, or a curve, extending to be more distant from the facing surface of the stator toward the middle of the third pattern, and the second magnet is embedded in the third pattern so as to be positioned closer to the middle of the third pattern compared to the first magnet.

14. The magnet-embedded rotating machine of claim 1, wherein the first magnet is embedded in a first pattern arranged in a form of a straight line, a bent line, or a curve, extending to be more distant from the facing surface of the stator toward the middle of the first pattern, and the second magnet is embedded in a second pattern arranged in a form of a bent line or a curve, extending to be more distant from the facing surface of the stator toward the middle of the second pattern, the second pattern being more distant from the facing surface of the stator than the first pattern.

15. The magnet-embedded rotating machine of claim 1, wherein the first magnet is embedded in portions of a third pattern arranged in a form of a straight line, a bent line, or a curve, extending to be more distant from the facing surface of the stator toward the middle of the third pattern, and the second magnet is embedded in the third pattern so as to be positioned closer to the middle of the third pattern compared to the first magnet.

\* \* \* \* \*